United States Patent
Uetani

(10) Patent No.: US 10,565,466 B2
(45) Date of Patent: Feb. 18, 2020

(54) IMAGE PROCESSOR AND IMAGE PROCESSING METHOD

(71) Applicant: Kabushiki Kaisha Toshiba, Minato-ku, Tokyo (JP)

(72) Inventor: Yoshiharu Uetani, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 131 days.

(21) Appl. No.: 15/457,210

(22) Filed: Mar. 13, 2017

(65) Prior Publication Data

US 2017/0262731 A1     Sep. 14, 2017

Related U.S. Application Data

(60) Provisional application No. 62/307,861, filed on Mar. 14, 2016.

(51) Int. Cl.
*G06K 9/46* (2006.01)
*G06T 1/60* (2006.01)

(52) U.S. Cl.
CPC ............ *G06K 9/4671* (2013.01); *G06T 1/60* (2013.01)

(58) Field of Classification Search
CPC .............................. G06K 9/4671; G06T 1/60
USPC ...................................................... 382/195
See application file for complete search history.

(56) References Cited

U.S. PATENT DOCUMENTS

| 2014/0347496 A1* | 11/2014 | Solhusvik | H04N 5/378 348/175 |
| 2015/0294483 A1* | 10/2015 | Wells | H04N 7/181 382/103 |
| 2016/0007839 A1* | 1/2016 | Yoshida | A61B 1/04 600/509 |

FOREIGN PATENT DOCUMENTS

| JP | H05-028230 A | 2/1993 |
| JP | H06-006832 A | 1/1994 |
| JP | 2007074203 A | 3/2007 |

* cited by examiner

*Primary Examiner* — Amandeep Saini
(74) *Attorney, Agent, or Firm* — White & Case LLP

(57) ABSTRACT

An image processing apparatus according to an embodiment includes an arranger, an image processor, an evaluation value calculator, and an abnormality detector. The arranger arranges a test data sequence in a blanking period of video data including an image data region in which image data is arranged and the blanking period in which the image data is not arranged. The image processor applies image processing to the test data sequence arranged in the video data and the image data. The evaluation value calculator calculates an evaluation value based on an image processing result of the test data sequence in the video data. The abnormality detector outputs a signal indicating an abnormality when the evaluation value does not fluctuate according to the predetermined order.

16 Claims, 11 Drawing Sheets

IMAGE PROCESSOR AND IMAGE PROCESSING METHOD

CROSS REFERENCE TO RELATED APPLICATIONS

This application is based upon and claims the benefit of priority from the prior U.S. Provisional Patent Application No. 62/307,861, filed on Mar. 14, 2016, the entire contents of which are incorporated herein by reference.

FIELD

Embodiments described herein relate to an image processing apparatus and an image processing method.

BACKGROUND

Image processing is applied to image data in captured video data. Traveling support control is performed on the basis of an obstacle recognition result obtained by using images of the image data. When an image processing apparatus that generates the images used for the obstacle recognition stops normally operating, it is necessary to notify an abnormality of the image processing apparatus according to abnormality occurrence in an image processing result such that wrong traveling support control is not performed.

DETAILED DESCRIPTION OF THE INVENTION

An image processing apparatus according to an embodiment includes an input unit, an arranger, an image processor, an output unit, an evaluation value calculator, and an abnormality detector. The arranger arranges a test data sequence, which is input via the input unit, in predetermined order in a blanking period of video data including an image data region in which image data is arranged and the blanking period in which the image data is not arranged. The image processor applies image processing to the test data sequence arranged in the video data and the image data of the video data. The evaluation value calculator calculates an evaluation value based on a result of the image processing applied to the test data sequence in the video data. The abnormality detector outputs a signal indicating an abnormality of the image processing apparatus if the evaluation value does not fluctuate in the predetermined order.

Hereinafter, embodiments of the present invention will be described with reference to the drawings. The embodiments do not limit the present invention.

First Embodiment

An image processing apparatus according to a first embodiment arranges a test data sequence input on the basis of a predetermined frame cycle in a blanking period of video data and obtains an evaluation value based on a result of image processing applied to the test data sequence to thereby notify an abnormality of the image processing apparatus if the evaluation value does not fluctuate in predetermined order. Further details will be explained below.

Figure 1:
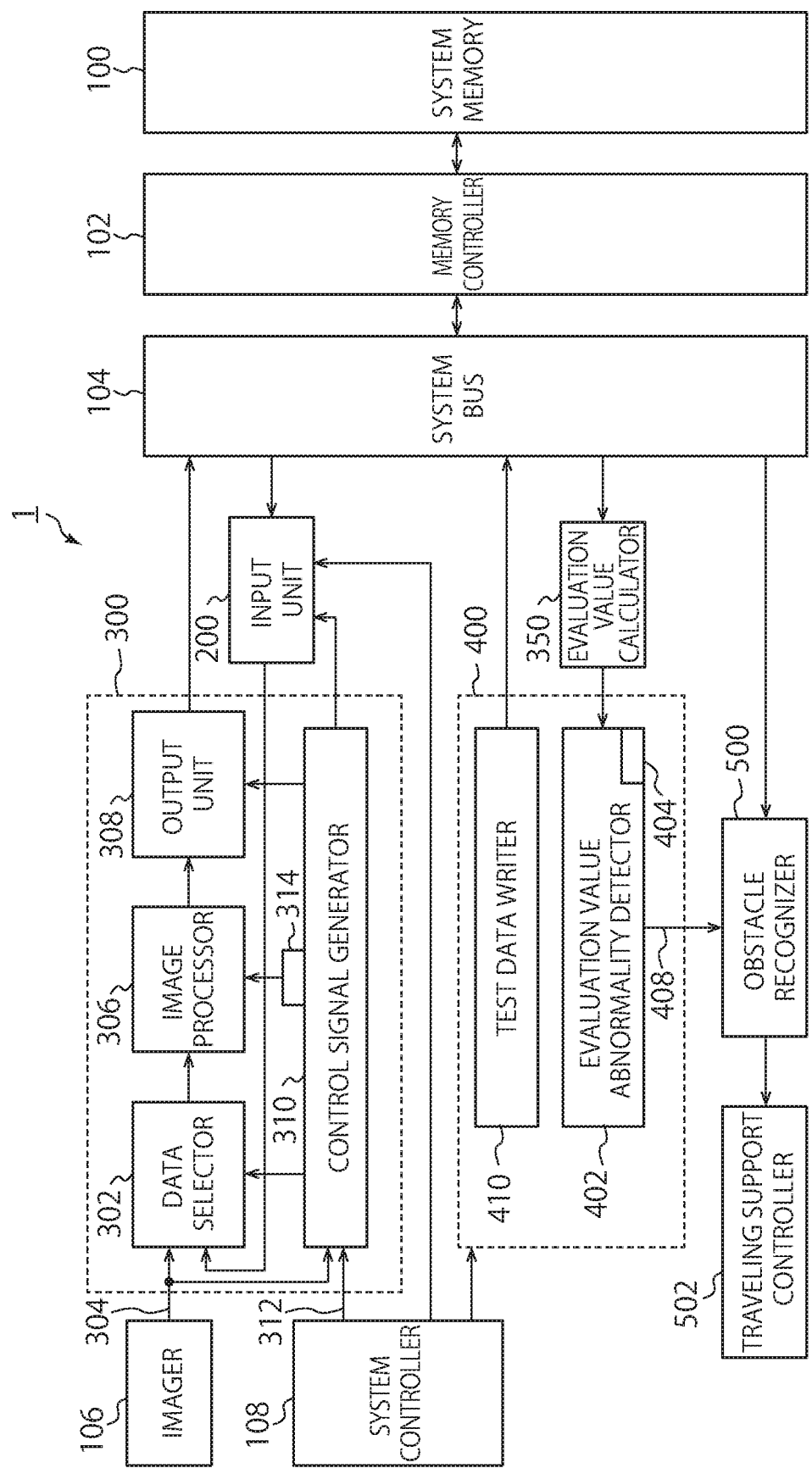
FIG. 1 is a block diagram showing the configuration of an image processing apparatus according to a first embodiment.

An image processing apparatus 1 according to the first embodiment is explained with reference to FIG. 1. FIG. 1 is a block diagram showing the configuration of the image processing apparatus 1 according to the first embodiment. The image processing apparatus 1 is an image processing apparatus capable of applying the image processing to video data and evaluating a result of the image processing. As shown in FIG. 1, the image processing apparatus 1 includes a system memory 100, a memory controller 102, a system bus 104, an imager 106, a system controller 108, an input unit 200, a video processor 300, an evaluation value calculator 350, an abnormality detector 400, an obstacle recognizer 500, and a traveling support controller 502.

The system memory 100 stores a plurality of test data sequences and stores video data applied with the image processing. The memory controller 102 is connected to the system memory 100 and the system bus 104. The memory controller 102 reads out data from and writes data in the system memory 100. The system bus 104 is connected to the memory controller 102, the input unit 200, the video processor 300, the evaluation value calculator 350, the abnormality detector 400, and the obstacle recognizer 500 and transmits data.

The imager 106 captures a video and generates video data. For example, the imager 106 is a television camera. The system controller 108 is a microprocessor or the like for controlling the image processing apparatus 1.

The input unit 200 is connected to the system bus 104 and the video processor 300. The input unit 200 reads a plurality of test data sequences from the system memory 100 in predetermined order and supplies the test data sequences to the video processor 300. That is, the plurality of test data sequences stored in the system memory 100 are supplied to the video processor 300 in order in synchronization with input timing of video data from the imager 106.

When the plurality of test data sequences are supplied, the number of times the same test data sequence is continuously supplied is referred to the number of repetitions. Timing of the supply of the test data sequences is synchronized with a frame cycle of capturing of video data. For example, if there are two types A and B as the test data sequences and the test data sequences are supplied in the order of [A, A, B, B] and [A, A, B, B], the number of repetitions of A is two and the number of repetitions of B is two. One cycle of the supply of the test data sequences is a four-frame cycle. In a period of the four-frame cycle, four video data are supplied to the video processor 300 in order. Similarly, if the test data sequences are supplied in the order of [A, A, A, B, B] and [A, A, A, B, B], the number of repetitions of A is three and the number of repetitions of B is two. The supply of the test data sequences is repeated at a five-frame cycle. In a period of the five-frame cycle, five video data are supplied to the video processor 300 in order.

The video processor 300 is connected to the system bus 104, the imager 106, the system controller 108, and the input unit 200. The video processor 300 applies the image processing to video data in which a test data sequence is arranged in a blanking period and outputs the video data. More specifically, the video processor 300 includes a data selector 302, a terminal unit 304, an image processor 306, an output unit 308, a control signal generator 310, a control terminal unit 312, and a changer 314.

A test data sequence is input to the data selector 302 from the input unit 200. Further, the imager 106 is connected to the data selector 302 via the terminal unit 304. Video data is supplied to the data selector 302 from the imager 106. The data selector 302 arranges the test data sequence input from the input unit 200 in a predetermining timing position of the blanking period in the supplied video data.

The video data in which the test data sequence is arranged in the blanking period is supplied to the image processor 306 from the data selector 302. The image processor 306 applies the image processing, in which the same image processing parameters are used, to the test data sequence and image data (image data in an effective video data period) in the supplied video data.

The image processing includes a plurality of kinds of signal processing such as demosaic processing, color space conversion processing, noise reduction processing, and gradation conversion processing. Each of the kinds of signal processing includes a plurality of image processing parameters. Therefore, combinations of the image processing parameters used in the image processing are sometimes as many as several thousand or more. The image processor 306 may apply the image processing while differentiating image processing parameters for video data on the upper side of an imaging screen and image processing parameters for video data on the lower side.

The video data applied with the image processing is supplied to the output unit 308 from the image processor 306. The output unit 308 packs the video data applied with the image processing into a predetermined format and outputs the video data to the system memory 100.

The system controller 108 is connected to the control signal generator 310 via the control terminal unit 312. Further, the input unit 200, the data selector 302, the image processor 306, and the output unit 308 are connected to the control signal generator 310. Consequently, the control signal generator 310 controls the input unit 200, the data selector 302, the image processor 306, and the output unit 308 according to operation setting input from the system controller 108. For example, the system controller 108 performs, in the input unit 200, selection setting for a test data sequence to be read out. The control signal generator 310 outputs a start signal to the input unit 200 at timing based on a vertical synchronization signal vsync input from the terminal unit 304. Further, the control signal generator 310 outputs control signals corresponding to the operation setting by the system controller 108 to the data selector 302, the image processor 306, and the output unit 308 at the timing based on the vertical synchronization signal vsync and causes the data selector 302, the image processor 306, and the output unit 308 to perform processing for one frame according to the timing of sync.

The changer 314 changes the image processing parameters of the image processor 306 according to the operation setting by the system controller 108.

The evaluation value calculator 350 reads out video data in a predetermined range in a result of the image processing applied to a test data sequence stored in the system memory, performs signal processing, and calculates an evaluation value of the read-out video data.

For example, the evaluation value calculator 350 performs processing of any one of cyclic redundancy check (CRC), checksum, and hash in a predetermined range of the result of the image processing applied to the test data sequence and calculates an evaluation value.

Image data (image data in an effective video data period) is different every time imaging is performed. Therefore, since a result of processing applied to the image data cannot be learned in advance, it is difficult to determine an abnormality of the image processing apparatus using the evaluation value of the result of the image processing applied to the image data. On the other hand, since a test data sequence is a data sequence decided in advance, if the image processing apparatus is normally operating, an image processing result obtained by applying the image processing to the same test data sequence using the same image processing parameters is always the same value. Therefore, an abnormality of the image processing apparatus 1 is determined by evaluating the image processing result obtained by applying the image processing to the test data sequence.

The system bus 104, the evaluation value calculator 350, and an external device are connected to the abnormality detector 400. The abnormality detector 400 is configured by, for example, a microprocessor. If detecting an abnormality of the image processor 306 or an abnormality of a communication path of the image processing apparatus 1 on the basis of the evaluation value calculated by the evaluation value calculator 350, the abnormality detector 400 outputs a signal indicating an abnormality of the image processing apparatus 1. The abnormality detector 400 includes an evaluation value abnormality detector 402, a storage 404, a terminal unit 408, and a test data writer 410.

The storage 404 is connected to the evaluation value abnormality detector 402. If an evaluation value acquired via the evaluation value calculator 350 from video data obtained by applying the image processing to a test data sequence and a reference evaluation value acquired from the storage 404 do not coincide with each other, the evaluation value abnormality detector 402 generates a first detection signal indicating an abnormality of the image processing apparatus 1. The reference evaluation value is a value obtained by applying processing equivalent to the signal processing of the evaluation value calculator 350 to an image processing result obtained by applying the image processing to a predetermined test data sequence using image processing parameters of an evaluation target.

Further, if an evaluation value does not predeterminedly fluctuate according to a change of a test data sequence input to the image processor 306, the evaluation value abnormality detector 402 generates a second test detection signal indicating an abnormality of the communication path of the image processing apparatus 1. For example, in some cases, an abnormality occurs in the communication path or the like of the image processing apparatus 1 and the reference evaluation value stored in the storage 404 is not updated and, in other cases, an abnormality is present in an output path of an image processing result and the image processing result is not updated. In such cases, the evaluation value coincides with the reference valuation value and an abnormality of the image processing apparatus 1 cannot be detected. Therefore, the test data sequence input to the image processor 306 is cyclically changed to detect that the reference evaluation value predeterminedly fluctuates.

For example, if there are two types A and B as test data sequences and the test data sequences are supplied in the order of [A, A, B, B], as explained above, the number of repetitions of A is two and the number of repetitions of B is two. One cycle of the supply of the test data sequences is a four-frame cycle. When evaluation values of an image processing result are represented as [EA0, EA1, EA0, EB1] and reference evaluation values are represented as [SEA, SEA, SEB, SEB], if inconsistency with the reference evaluation value SEA is present in the evaluation values EA0 and EA1 in a two-frame period of A or if inconsistency with the reference evaluation value SEB is present in the evaluation values EB0 and EB1 of a two-frame period of B, the evaluation value abnormality detector 402 generates a first detection signal indicating an abnormality of the image processing apparatus 1.

For example, if the evaluation values of the image processing result do not fluctuate according to changes of the test data sequences such as [EA0, A1, EA0, EA1] or [EB0, EB1, EB0, EB1], the evaluation value abnormality detector 402 generates a second signal indicating that an abnormality is present in the communication path of the image processing apparatus 1.

The evaluation value abnormality detector 402 stores, as a reference evaluation value of the next time, an evaluation value acquired from the evaluation value calculator 350. Therefore, even if a reference evaluation value is not stored in advance, it is possible to perform abnormality detection of the image processing apparatus 1 in the image processing of video data captured thereafter.

When generating the first detection signal or the second detection signal, the evaluation value abnormality detector 402 outputs, via the terminal unit 408, an abnormality detection signal indicating an abnormality of the image processing apparatus 1. The abnormality detection signal is input to the obstacle recognizer 500, which is an external device.

The test data writer 410 is connected to the system bus 104. The test data writer 410 stores a test data sequence in the system memory 100 in advance.

The obstacle recognizer 500 is connected to the system bus 104. The obstacle recognizer 500 performs obstacle recognition using image data subjected to the image processing by the video processor 300, outputs a control signal corresponding to a result of the obstacle recognition, and inputs the control signal to the traveling support controller 502, which is an external device. The obstacle recognizer 500 disables the obstacle recognition result according to the abnormality detection signal received from the abnormality detector 400 to prevent the traveling support controller 502 from performing dangerous traveling support control.

Figure 2:
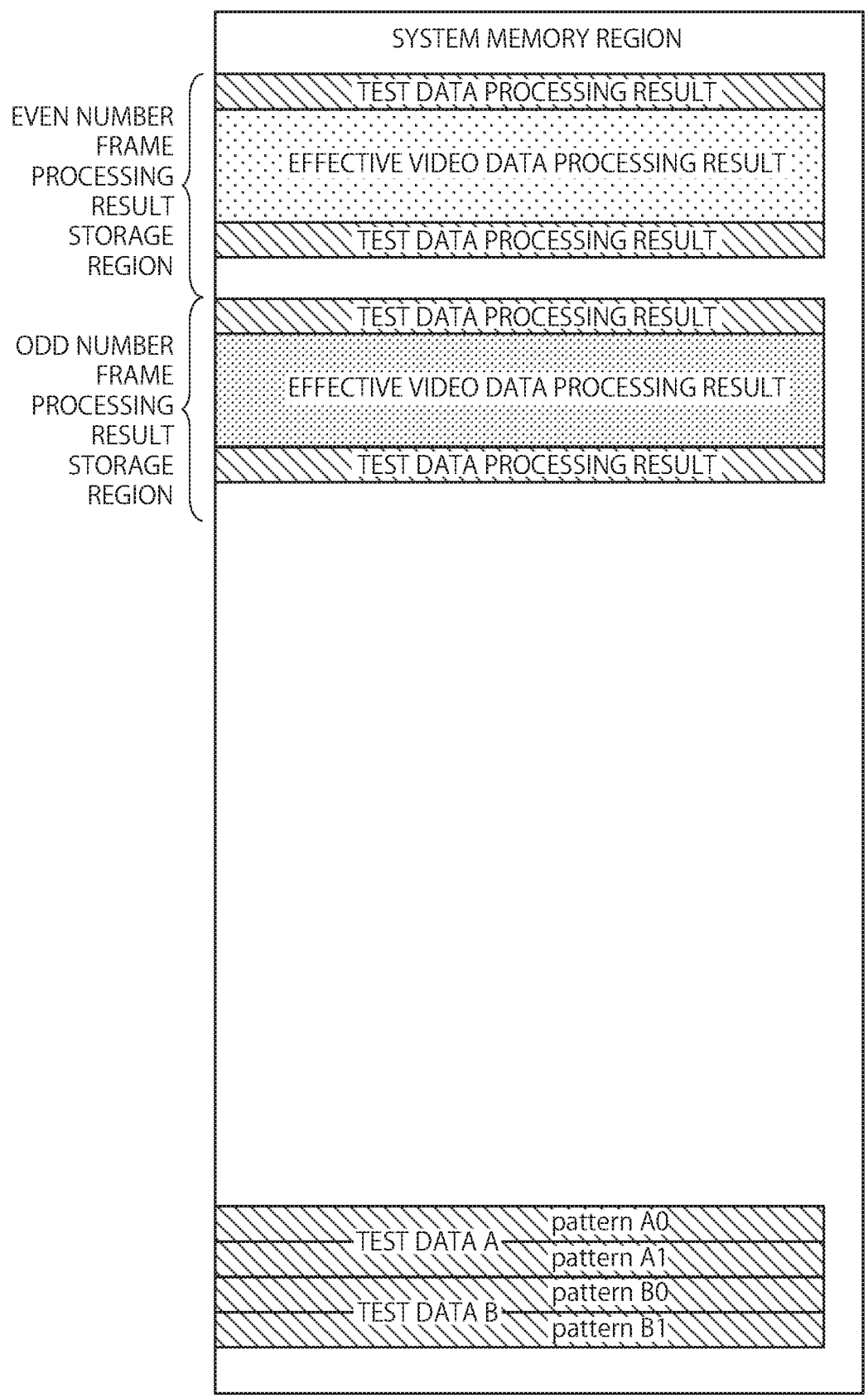
FIG. 2 is a diagram showing an arrangement example of a test data sequence and a processing result, which is obtained by applying image processing to video data, stored in a system memory.

An arrangement example of a test data sequence and image processing result data stored in the system memory 100 by the test data writer 410 and the output unit 308 is explained with reference to FIG. 2. FIG. 2 is a diagram showing an arrangement example of a test data sequence and a processing result, which is obtained by applying the image processing to video data, stored in the system memory 100. As shown in FIG. 2, a test data sequence (test data A and test data B) is stored in the system memory 100 by the test data writer 410 and input to the data selector 302 via the input unit 200. The test data sequence (the test data A and the test data B) may be a data sequence in which numerical values are artificially arranged or may be a data sequence configured by a part of a natural image.

Figure 3:
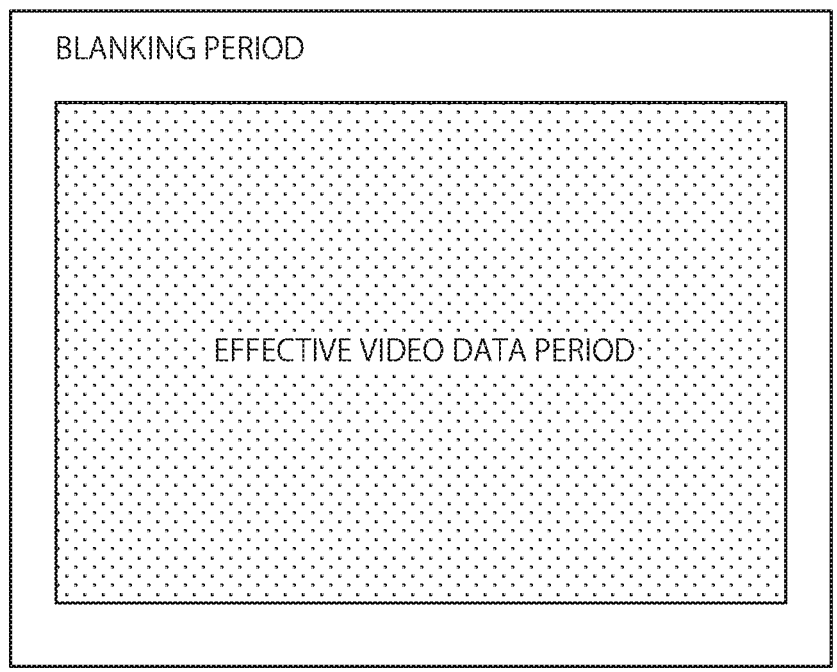
FIG. 3 is a diagram showing a data region of the video data.

A blanking period and an effective video data period of video data input from the imager 106 are explained with reference to FIG. 3. FIG. 3 is a diagram showing a data configuration of video data input from the imager 106. As shown in FIG. 3, the video data is configured by a blanking period indicated by a blanking period and image data indicated by an effective video data period. The blanking period is divided into a vertical blanking period in an upper part of a screen of the video data and a vertical blanking period in a lower part of the screen of the video data. Further, the blanking period is divided into a horizontal blanking period in a left part of the screen of the video data and a horizontal blanking period in a right part of the screen of the video data.

Figure 4:
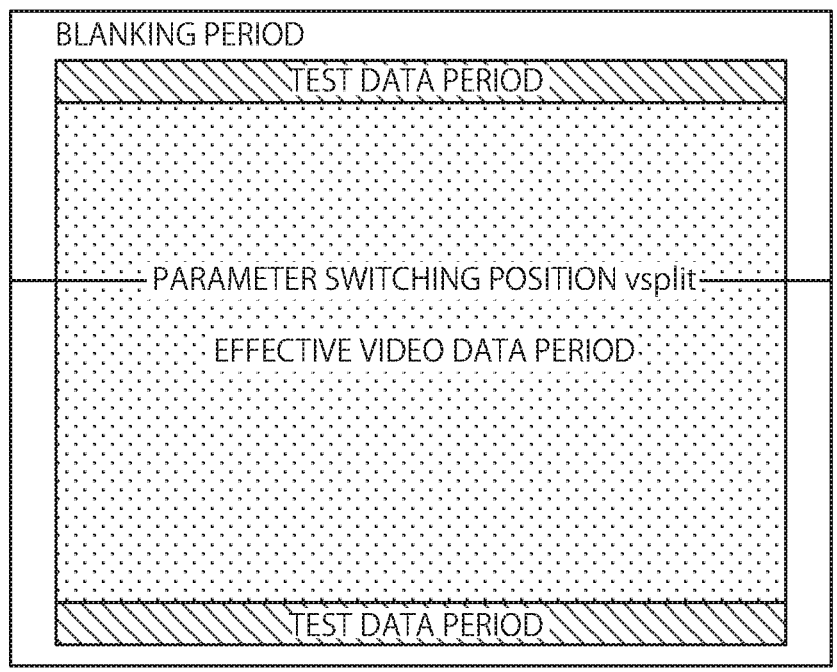
FIG. 4 is a diagram showing an arrangement example of a test data sequence during a blanking period.

An example of an arrangement position of a test data sequence is explained with reference to FIG. 4. FIG. 4 is a diagram showing an arrangement position of a test data sequence in a blanking period. As shown in FIG. 4, a period indicated by a test data period in the blanking period is an arrangement position of a test data sequence (a pattern A0 and a pattern A1 of the test data A or a pattern B0 and a pattern B1 of the test data B). That is, the data selector 302 arranges the test data sequence (the pattern A0 and the pattern A1 of the test data A or the pattern B0 and the pattern B1 of the test data B) read out from the system memory 100 by the input unit 200 in both or one of the vertical blanking period in the upper part of the screen of the video data and the vertical blanking period in the lower part of the screen of the video data.

In this case, the test data sequence (the pattern A0 of the test data A or the pattern B0 of the test data B) arranged in the vertical blanking period in the upper part of the screen and the test data sequence (the pattern A1 of the test data A or the pattern B1 of the test data B) arranged in the vertical blanking period in the lower part of the screen are read out from the system memory 100 by the input unit 200 and supplied to the data selector 302. The test data sequence (the pattern A0 of the test data A or the pattern B0 of the test data B) may be arranged only in one of the vertical blanking period in the upper part and the vertical blanking period in the lower part. Note that, in this embodiment, the data selector 302 corresponds to an arranger that arranges test data in a blanking period of video data. The control signal generator 310 corresponds to a timing controller that controls operation timings of the input unit 200, the data selector 302, the image processor 306, and the output unit 308.

The following is explanation of the overall configuration of the image processing apparatus 1 according to this embodiment. An example of test operation of the image processing apparatus 1 is explained with reference to FIGS.

Figure 5:
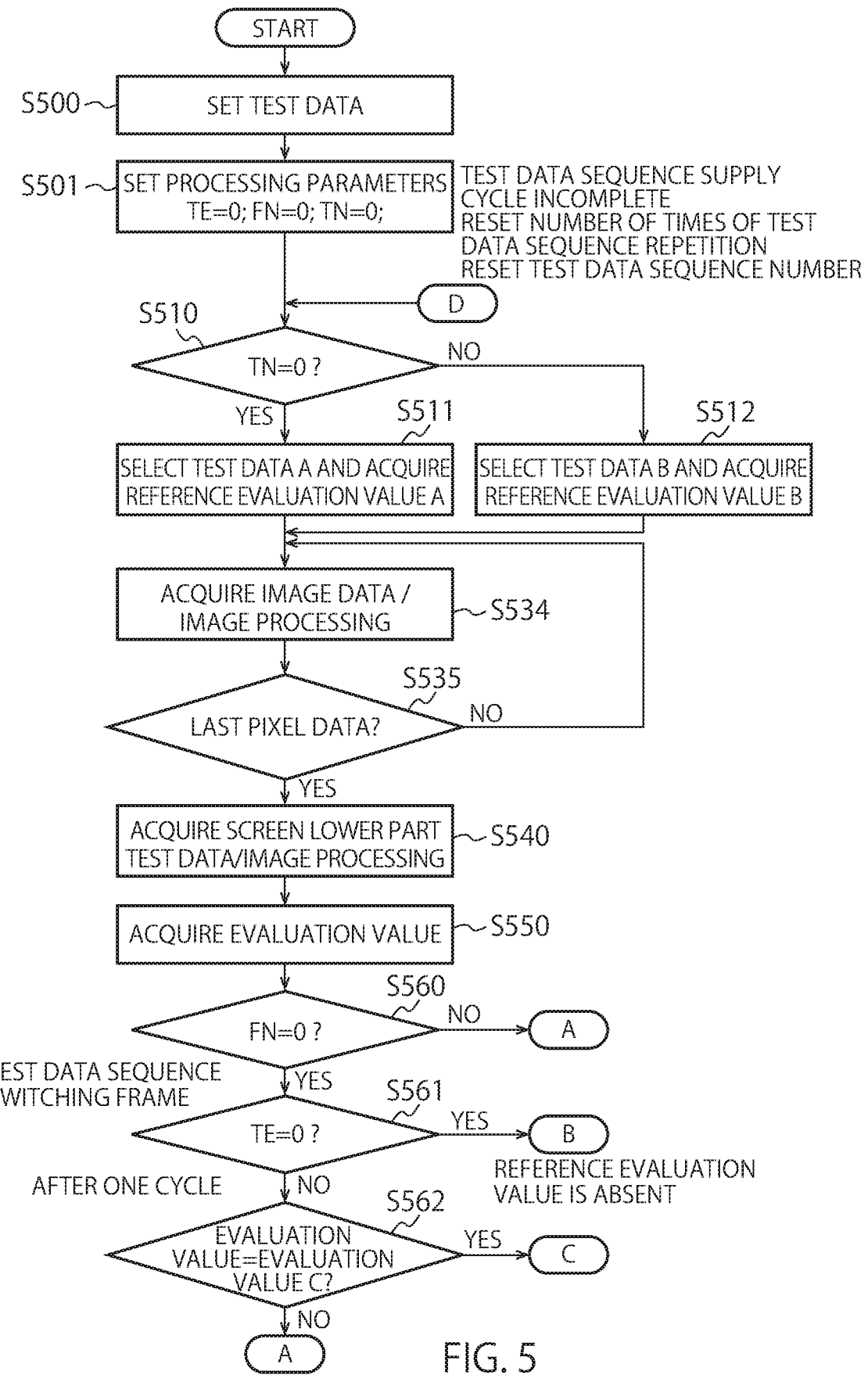
FIG. 5 is a flowchart for explaining an example (a former half) of a test operation of the image processing apparatus.
Figure 6:
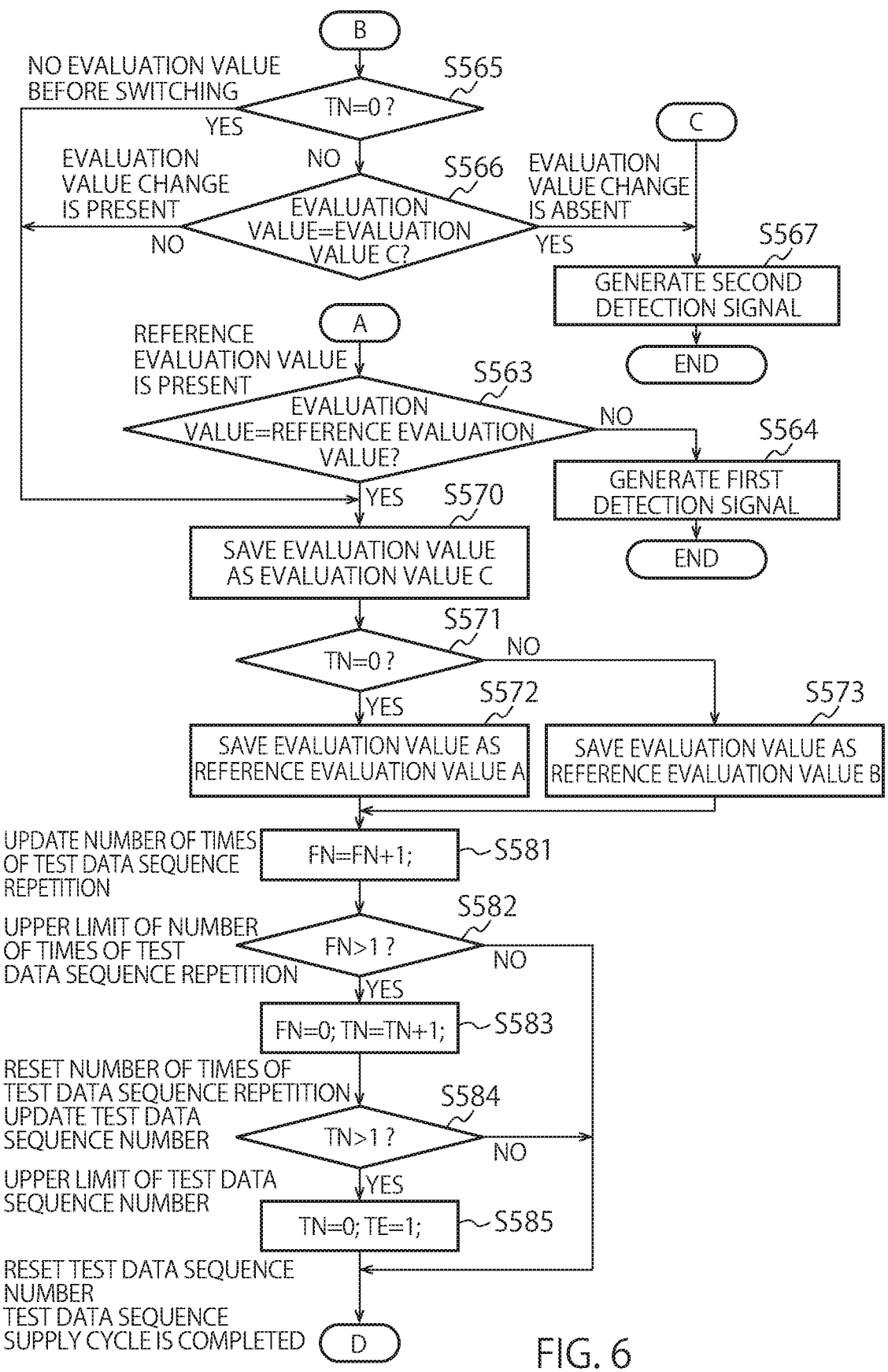
FIG. 6 is a flowchart for explaining the example (a latter half) of the test operation of the image processing apparatus.

5 and 6. FIGS. 5 and 6 are flowcharts for explaining the example of the test operation of the image processing apparatus 1. In the test operation, two kinds of data, that is, the test data A and the test data B are used as a test data sequence and the test data are switched by the number of repetitions of 2 corresponding to the number of frame buffers of the system memory 100. In this example, one cycle of supply of the test data sequence is a four-frame cycle. Consequently, the test data sequence is supplied in the order of [the test data A, the test data A, the test data B, the test data B]. It is assumed that the test data A is the pattern A0 and the test data B is the pattern B0. A test data sequence of the pattern A0 and the pattern B0 is arranged only in a blanking period on the lower side.

First, the test-data writer 410 stores the test data sequence in the system memory 100 (step S500).

Subsequently, the system controller 108 sets image processing parameters in the control signal generator 310 and performs initialization of comparison processing in the evaluation value abnormality detector 402 (step S501). In the initialization of the comparison processing, supply cycle information of the test data sequence is set to a cycle incomplete state (TE=0), the number of times of test data sequence repetition is set to 0 (FN=0), and a test data sequence number is set to 0 (TN=0).

Subsequently, the system controller 108 determines whether a test data sequence input to the input unit 200 is the test data sequence corresponding to the test data sequence number (TN) (step S510). If the test data sequence is the test data sequence corresponding to the setting (YES in step S510), the system controller 108 acquires the test data A corresponding to TN=0 and acquires a reference evaluation value A from the storage 404 (step S511). On the other hand, if the test data sequence is not the test data sequence corresponding to the setting (NO in step S510), the system controller 108 acquires the test data B and acquires a reference evaluation value B from the storage 404 (step S512).

Subsequently, the data selector 302 acquires, for each of pixels, image data (image data in an effective video data period) for one frame (step S534). The data selector 302 determines whether the pixel is a last pixel in the image data (step S535). If the pixel is not the last pixel (NO in step S535), the data selector 302 acquires the next pixel. If the pixel is the last pixel (YES in step S535), the data selector 302 acquires a test data sequence from the input unit 200 started to be read at timing based on the vertical synchronization signal vsync and arranges the test data sequence in a test data period of a blanking period (step S540). The image processor 306 performs the image processing on the acquired image data and the acquired test data sequence on the basis of the image processing parameters set in step S501. The test data sequence is used in the order of [the pattern A0, the pattern A0, the pattern B0, the pattern B0] for each of input frames according to the test data sequence number (TN).

Subsequently, the evaluation value abnormality detector 402 causes the evaluation value calculator 350 to calculate an evaluation value by a cyclic redundancy check of a result of the image processing applied to the test data sequence stored in the system memory 100 and acquires the evaluation value (step S550).

Subsequently, the evaluation value abnormality detector 402 determines whether the test data sequence is not switched yet (FN>0) or is switched (FN=0) (step S560). If it is determined that the test data sequence is not switched yet (FN>0) (NO in step S560), the evaluation value abnormality detector 402 performs the processing from A of FIG. 6. On the other hand, if it is determined that the test data sequence is just switched (FN=0) (YES in step S560), the evaluation value abnormality detector 402 determines whether one cycle of the input of the test data sequence has not (TE=0) or has ended (TE=1) (step S561). If it is determined that the one cycle of the input of the test data sequence has not ended (TE=0) (YES in step S561), the evaluation value abnormality detector 402 performs the processing from B of FIG. 6.

If it is determined that the one cycle of the input of the test data sequence has not ended (TE=0) (NO in step S561), an evaluation value C before the switching of the test data sequence is present. The evaluation value abnormality detector 402 compares the evaluation value C and the evaluation value acquired in step S550 (in this step, the evaluation value after the switching of the test data sequence) and determines whether the evaluation value has changed (step S562).

If it is determined that the evaluation value has not changed (NO in step S562), the evaluation value abnormality detector 402 performs the processing from A. On the other hand, if it is determined that the evaluation value has changed (YES in step S562), the evaluation value abnormality detector 402 performs the processing from C.

The processing from A is explained with reference to FIG. 6. The evaluation value abnormality detector 402 compares the reference evaluation value and the evaluation value acquired in step S550 and determines whether the evaluation value coincides with the reference evaluation value (step S563). If the evaluation value does not coincide with the reference evaluation value (NO in step S563), the evaluation value abnormality detector 402 generates a first detection signal indicating that an abnormality is present in the video processor 300 (step S564) and ends the processing.

On the other hand, if the evaluation value coincides with the reference evaluation value (YES in step S563), the evaluation value abnormality detector 402 saves the evaluation value as the evaluation value C (step S570).

Subsequently, the evaluation value abnormality detector 402 determines whether the test data sequence number is 0 (TN=0) (step S571). If TN=0 (YES in step S571), the evaluation value abnormality detector 402 saves the evaluation value as the evaluation value A (step S572). On the other hand, if the test data sequence number is not 0 (NO in step S571), the evaluation value abnormality detector 402 saves the evaluation value as the evaluation value B (step S573).

Subsequently, the system controller 108 and the evaluation value abnormality detector 402 increment the number of times of test data sequence repetition (FN) (step S581). The system controller 108 and the evaluation value abnormality detector 402 determine whether the number of times of test data sequence repetition (FN) has reached an upper limit (step S582). If the number of times of test data sequence repetition (FN) has reached the upper limit (YES in step S582), the system controller 108 and the evaluation value abnormality detector 402 initialize the number of times of test data sequence repetition (FN=0) and increment the test data sequence number (TN) (step S583).

Subsequently, the system controller 108 and the evaluation value abnormality detector 402 determine whether the test data sequence number (TN) has reached an upper limit (step S584). If the test data sequence number (TN) has reached the upper limit (YES in step S584), the system controller 108 and the evaluation value abnormality detector 402 initialize the test data sequence number (TN=0). The evaluation value abnormality detector 402 further sets the supply cycle information of the test data sequence to a cycle completed state (TE=1) (step S585). As in the case in which the number of times of test data sequence repetition (FN) has not reached the upper limit (NO in step S582) and the case in which the test data sequence number (TN) has not reached the upper limit (NO in step S584), the evaluation value abnormality detector 402 repeats the processing from S510.

The processing from B is explained. Even if the reference evaluation value for the evaluation value acquired in step S550 is absent, the evaluation value abnormality detector 402 determines whether the evaluation value C before the test data sequence switching is not (TN=0) or is present (TN>0) (step S565). If the evaluation value C is absent (YES in step S565), the evaluation value abnormality detector 402 performs the processing from step S570. On the other hand, if the evaluation value C is present (NO in step S565), the evaluation value abnormality detector 402 generates a second detection signal (step S567) and ends the processing. Similarly, when it is determined that the evaluation value has changed (YES in step S562), the evaluation value abnormality detector 402 generates the second detection signal (step S567) and ends the processing.

Note that, in step S501, the system controller 108 sets, in the storage 404, the reference evaluation value and the evaluation value C of the result of the image processing applied to the test data sequence in the image processing parameters in use and sets the supply cycle information of the test data sequence to the cycle completed state (TE=1). Consequently, it is possible to perform, from a leading frame, abnormality detection by the comparison with the reference evaluation value in step S563 and the abnormality detection by the comparison with the evaluation value C in step S562.

As explained above, in the test operation example, if the reference evaluation value is stored, it is possible to detect an abnormality of the video processor 300 by performing the comparison of the evaluation value and the reference evaluation value. Even if the reference evaluation value is not stored, since the evaluation value is stored as the reference evaluation value for the next and subsequent input frames, it is possible to perform the comparison of the evaluation value and the reference evaluation value from the next input frame.

The test data sequence is arranged in the blanking period on the lower side of the screen. Therefore, by checking the evaluation value of the result of the image processing applied to the test data sequence, it is possible to check presence or absence of an abnormality of the image processing apparatus immediately after the image processing of the image data in the effective video data period.

Furthermore, it is determined whether the evaluation values before and after the switching of the test data sequence input to the video processor 300 are different. Consequently, even if the reference evaluation value stored in the storage 404 is not updated because of an abnormality of the communication path of the image processing apparatus 1 or even if the image processing result is not updated because of an abnormality of the output path of the image processing result, it is possible to detect the abnormality. In this case, it is possible to perform the evaluation even if the reference evaluation value is not used. Therefore, it is possible to perform the evaluation, for example, even at timing when the image processing parameters are updated and the reference evaluation value is absent, for example, in the determination processing in step S566.

As explained above, according to this embodiment, the test data sequence is cyclically changed. Therefore, it is possible to detect an abnormality of the image processing apparatus 1 in which the image processing result is not changed even if the test data sequence is changed. Furthermore, if the reference evaluation value corresponding to the test data sequence and the image processing parameters is not stored, the image processing result obtained by applying the image processing to the test data sequence is stored as the reference evaluation value. Consequently, it is possible to perform, concerning the image processing parameters in use, the operation check of the video processor 300 including a larger number of image processing parameters.

(Modification)

The image processing apparatus 1 according to a modification arranges test data in both of the blanking period corresponding to the test data period on the upper side of the screen and the blanking period corresponding to the test data period on the lower side of the screen to thereby detect, if the image processing is performed with different image processing parameters on the upper side and the lower side of the screen of the video data, whether an abnormality is absent in both the kinds of image processing. Differences from the first embodiment are explained below.

As shown in FIG. 4, the image processor 306 according to the modification is different from the image processor 306 according to the first embodiment in that the image processor 306 according to the modification processes image data above a parameter switching position vsplit and image data below the parameter switching position vsplit using different image processing parameters. In this case, the test data sequence pattern A0 or pattern B0 is arranged in the blanking period on the upper side of the screen and the test data sequence pattern A1 or pattern B1 is arranged in the blanking period on the lower side of the screen.

Figure 7:
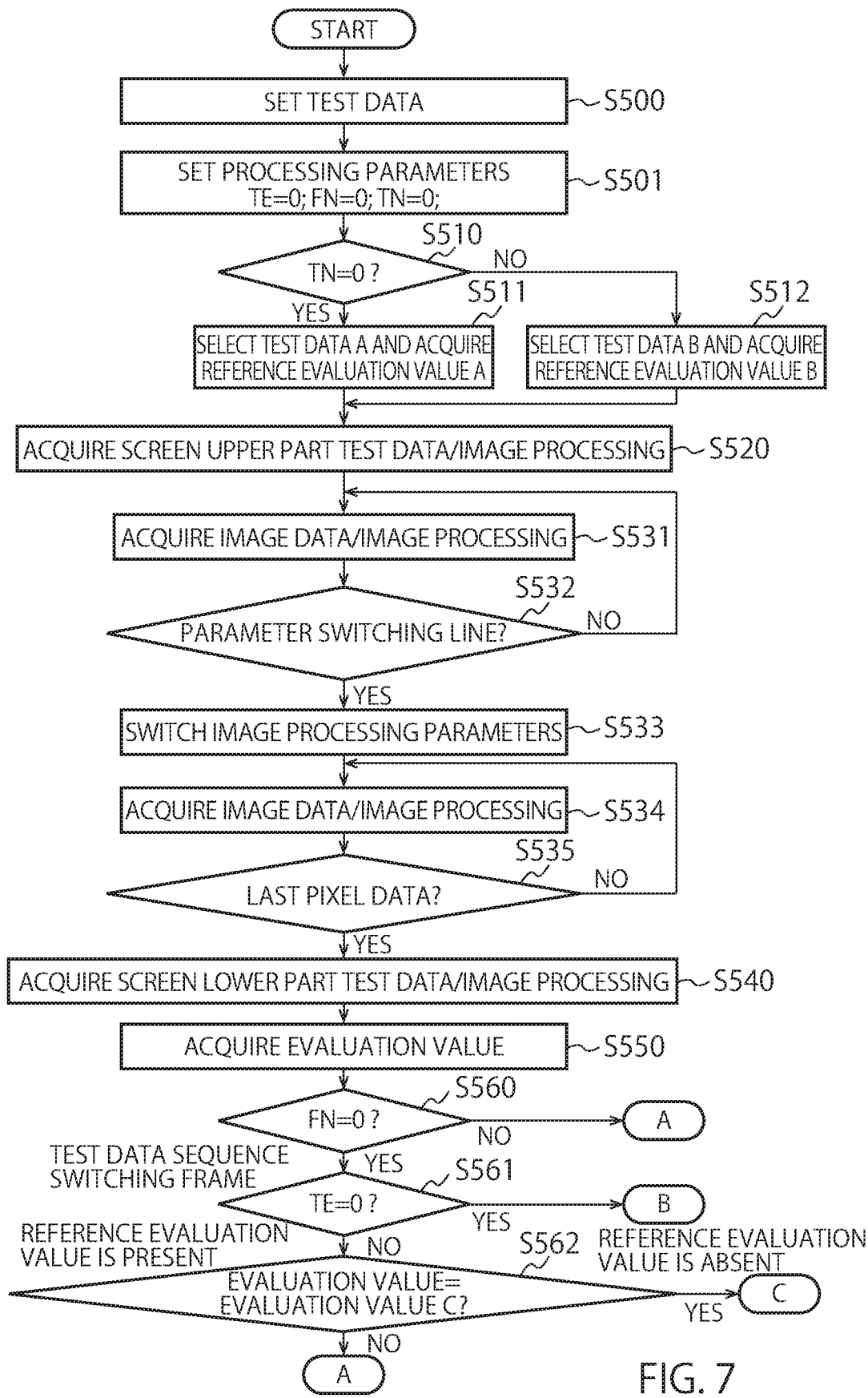
FIG. 7 is a flowchart for explaining a modification (a former half) of the test operation of the image processing apparatus.

FIG. 7 is a flowchart for explaining a former half of processing of an example of test operation of the image processing apparatus 1 according to this modification. A latter half of the processing is equivalent to the processing shown in FIG. 7. Therefore, illustration of the latter half of the processing is omitted. As shown in FIG. 7, after performing the processing in S500 to S512, the image processor 306 acquires test data sequence of the blanking period on the upper side of the screen and performs the image processing using the image processing parameters on the upper side of the screen (step S520). Subsequently, the image processor 306 sequentially acquires image data on the upper side of the screen (step S531). The image processor 306 determines whether image data of a parameter switching line is acquired (step S532). If the processing does not reach the parameter switching line (NO in step S532), the image processor 306 returns to step S531. On the other hand, if the processing reaches the parameter switching line (YES in step S532), the image processor 306 switches the image processing parameters to the image processing parameters on the lower side of the screen (step S533). The subsequent processing is the same as the processing shown in FIGS. 5 and 6. Therefore, explanation of the processing is omitted.

Note that, in this modification, the image processor 306 may individually calculate evaluation values respectively for the result of the image processing applied to the test data sequence on the upper side of the screen and the result of the image processing applied to the test data sequence on the lower side of the screen. However, the image processor 306 may connect the evaluation values to calculate one evaluation value. If the image processor 306 individually calculates the evaluation values on the upper side and the lower side of the screen, reference evaluation values for the upper side and the lower side of the screen need to be stored. However, if the image processor 306 calculates the combined evaluation value, the number of reference evaluation values to be stored is the same as the number in the first embodiment.

Consequently, if an abnormality is present in the image processing with the image processing parameters on the upper side of the screen, the result of the image processing applied to the test data sequence on the upper side of the screen is abnormal. If an abnormality is present in the image processing with the image processing parameters on the lower side of the screen, the result of the image processing applied to the test data sequence on the lower side of the screen is abnormal. By setting the image processing results of the test data sequences as evaluation values, it is possible to detect an abnormality of the video processor 300 concerning the image processing parameters in use.

As explained above, in this modification, the test data are arranged in the blanking period on the upper side of the screen of the video data and the blanking period on the lower side of the screen of the video data. Consequently, if the image processing is performed with the different image processing parameters on the upper side and the lower side of the screen of the video data, it is possible to check an operation state of the video processor 300 concerning the image processing parameters in use.

Second Embodiment

Image processing according to a second embodiment is image processing for cyclically changing a test data sequence read out from a system memory and mask data generated by a data mask unit to thereby reduce a readout period of the test data sequence. Differences from the first embodiment are explained below.

Figure 8:
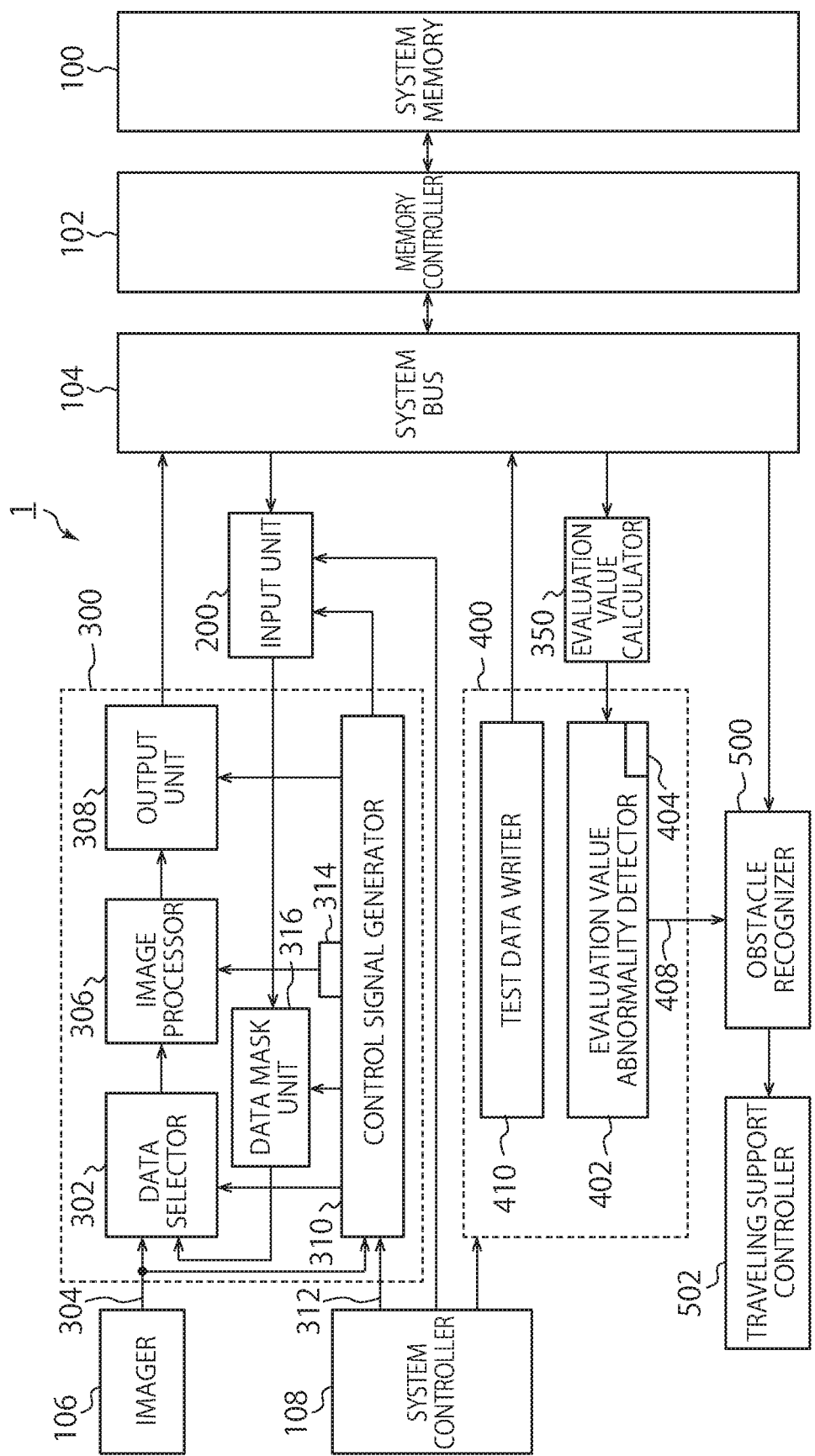
FIG. 8 is a block diagram showing the configuration of an image processing apparatus according to a second embodiment.

The image processing apparatus 1 according to the second embodiment is explained with reference to FIG. 8. FIG. 8 is a block diagram showing the configuration of the image processing apparatus 1 according to the second embodiment. As shown in FIG. 8, the image processing apparatus 1 according to the second embodiment is different from the image processing apparatus 1 according to the first embodiment in that the image processing apparatus 1 according to the second embodiment includes a data mask unit 316. Components same as the components of the image processing apparatus 1 according to the first embodiment are denoted by the same reference numerals and signs. Redundant explanation of the components is omitted.

Figure 9:
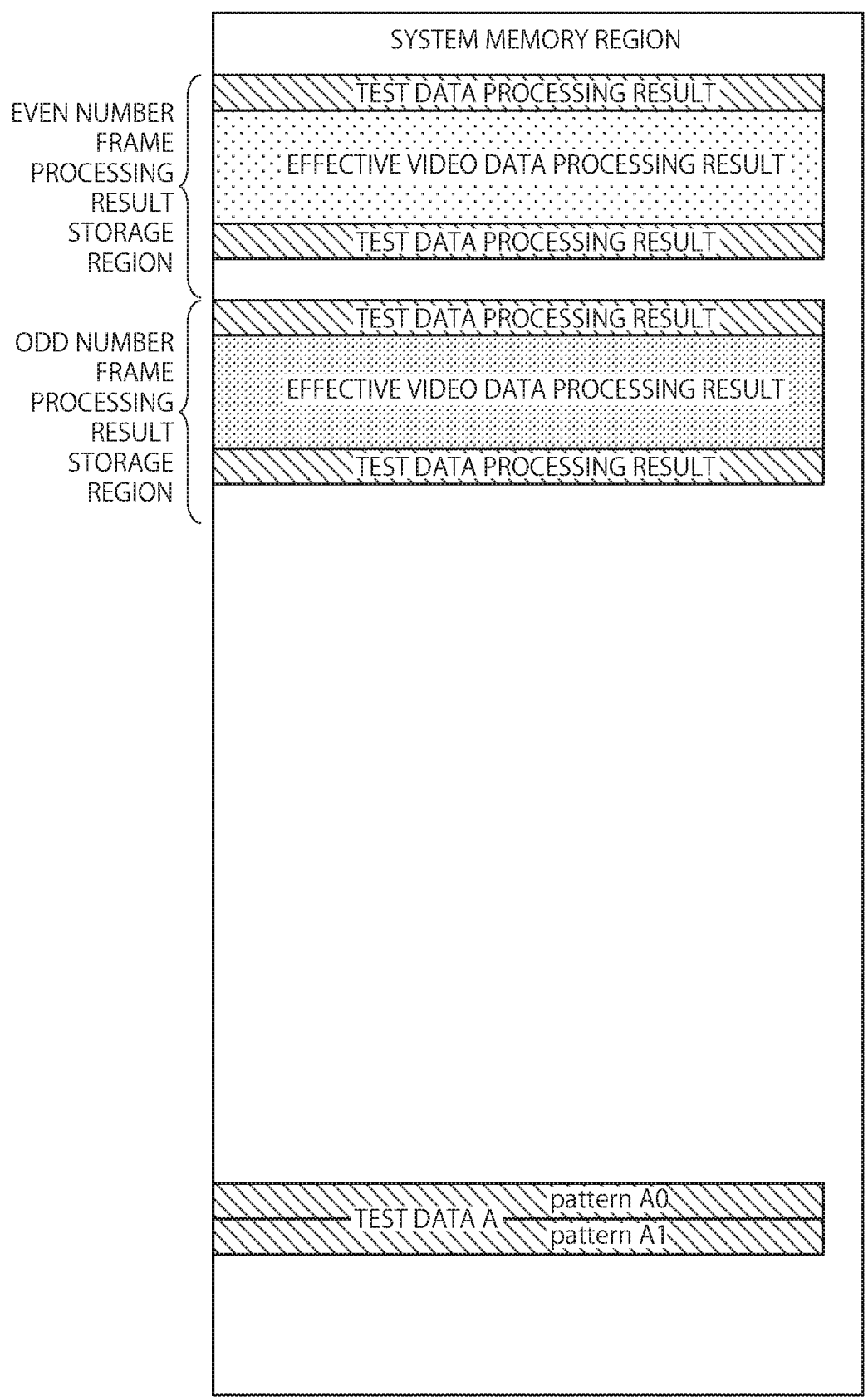
FIG. 9 is a diagram showing an arrangement example of a test data sequence and a processing result, which is obtained by applying image processing to the test data sequence, stored in a system memory when a data mask unit is used.

An arrangement example in the system memory 100 of a test data sequence according to the second embodiment is explained with reference to FIG. 9. FIG. 9 is a diagram showing a test data sequence (the test data A) acquired by the data mask unit 316 and a processing result obtained by applying the image processing to the test data sequence. As shown in FIG. 9, only one type of the test data sequence is stored. As in the first embodiment, the test data sequence is stored in the system memory 100 by the test data writer 410.

The data mask unit 316 is connected to the data selector 302, the control signal generator 310, and the input unit 200. The data mask unit 316 has a function of directly outputting a test data sequence read out from the system memory 100 via the input unit 200. The data mask unit 316 has a function of outputting mask data set to a predetermined value. That is, the data mask unit 316 switches the test data sequence read out from the system memory 100 and the mask data according to cyclical control by the control signal generator 310 and outputs the test data sequence and the mask data to the data selector 302. For example, if the test data sequence is switched for every two frames, the data mask unit 316 outputs test data read out from the system memory 100 to video data for the two frames and outputs the mask data to the next video data for two frames.

Consequently, in the video data of the two-frame period, the data selector 302 arranges a test data sequence read out from the system memory 100 in a blanking period. In video data of the next two-frame period, the data selector 302 arranges the mask data in the blanking period. In this way, the data selector 302 alternately uses the test data sequence and the mask data at every predetermined frame cycle. As it is seen from the above, when the mask data is used, a test data sequence is unnecessary in a period in which the mask data is used. Therefore, it is possible to reduce bus band width and power consumption for reading out the test data sequence from the system memory 100. Consequently, an effect of reduction of bus band width and power consumption of the test operation as a whole can also be expected. Since the test data sequence and the mask data are cyclically switched, as in the first embodiment in which the test data sequence is cyclically switched, even if the reference evaluation value stored in the storage 404 is not updated because of occurrence of an abnormality in the communication path of the image processing apparatus 1 or even if the image processing result is not updated because of occurrence of an abnormality in the output path of the image processing result, the evaluation value abnormality detector 402 can detect the abnormality.

As explained above, according to this embodiment, the data mask unit 316 cyclically switches the test data sequence and the mask data and outputs the test data sequence and the mask data to the data selector 302. Consequently, it is possible to reduce the bus band width and the power consumption for reading out the test data from the system memory 100. It is possible to reduce the bus band width and the power consumption of the test operation as a whole. Furthermore, since the test data sequence and the mask data are cyclically switched, it is possible to detect an abnormality of the image processing apparatus 1 in which the reference evaluation value stored in the storage 404 and the image processing result output to the system memory 100 are not updated.

Third Embodiment

The image processing apparatus 1 according to a third embodiment is different from the image processing apparatus 1 according to the second embodiment in that three video processors 300 are provided and respectively configured to be capable of performing image processing on video data. Differences from the second embodiment as explained below.

Figure 10:
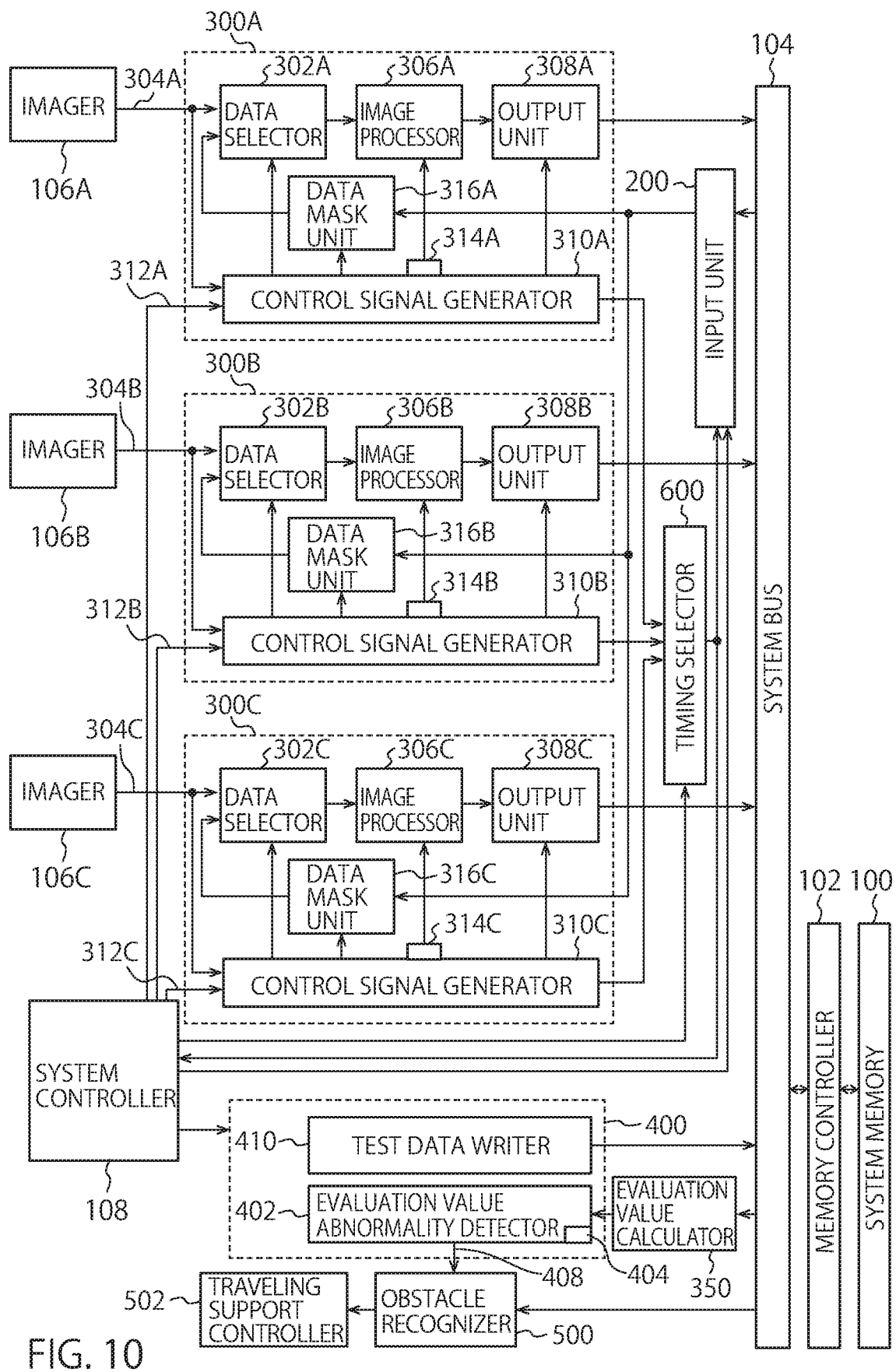
FIG. 10 is a block diagram showing the configuration of an image processing apparatus according to a third embodiment.

The image processing apparatus 1 according to the third embodiment is explained with reference to FIG. 10. FIG. 10 is a block diagram showing the configuration of the image processing apparatus 1 according to the third embodiment. As shown in FIG. 10, the image processing apparatus 1 according to a third embodiment is different from the image processing apparatus 1 according to the second embodiment in that the three video processors 300 are provided and respectively configured to be capable of performing the image processing on video data. As shown in FIG. 10, the image processing apparatus 1 according to the third embodiment includes the system memory 100, the memory controller 102, the system bus 104, the input unit 200, a first video processor 300A, a second video processor 300B, a third video processor 300C, the evaluation value calculator 350, an abnormality detector 400, the obstacle recognizer 500, the traveling support controller 502, and a timing selector 600. Note that, in the following explanation, A is added to reference numerals concerning the components of the first video processor 300, B is added to reference numerals concerning the components of the second video processor 300, and C is added to reference numerals concerning the components of the third video processor 300. Components equivalent to the components of the image processing apparatus 1 according to the second embodiment are denoted by the same reference numerals and signs. Redundant explanation of the components is omitted.

That is, a first video processor 300A is a component equivalent to the video processor 300 according to the second embodiment. The first video processor 300A includes a data selector 302A, a terminal unit 304A, an image processor 306A, an output unit 308A, a control-signal generator 310A, a control terminal unit 312A, a changer 314A, and a data mask unit 316A. The data mask unit 316A cyclically switches a first test data sequence (the test data A) and mask data and supplies the first test data sequence and the mask data to the data selector 302A as a test data sequence. The data selector 302A arranges the test data sequence in a predetermined position of a blanking period of video data. The image processor 306A applies the image processing to the video data in which the test data sequence is arranged. The output unit 308A packs the video data applied with the image processing into a predetermined format and outputs the video data to the system memory 100. The control signal generator 310A controls the data selector 302A, the image processor 306A, the output unit 308A, the control signal generator 310A, and the data mask unit 316A.

The second video processor 300B has a configuration equivalent to the configuration of the video processor 300 according to the second embodiment. The second video processor 300B includes a data selector 302B, a terminal unit 304B, an image processor 306B, an output unit 308B, a control signal generator 310B, a control terminal unit 312B, a changer 314B, and a data mask unit 316B. The data mask unit 316B cyclically switches a second test data sequence (the test data B) and mask data and supplies the second test data sequence and the mask data to the data selector 302B as a test data sequence. The data selector 302B arranges the test data sequence in a predetermined position of a blanking period of video data. The image processor 306B applies the image processing to the video data in which the test data sequence is arranged. The output unit 308B packs the video data applied with the image processing into a predetermined format and outputs the video data to the system memory 100. The control signal generator 310B controls the data selector 302B, the image processor 306B, the output unit 308B, the control signal generator 310B, and the data mask unit 316B.

The third video processor 300C has a configuration equivalent to the configuration of the video processor 300 according to the second embodiment. The third video processor 300C includes a data selector 302C, a terminal unit 304C, an image processor 306C, an output unit 308C, a control signal generator 310C, a control terminal unit 312C, a changer 314C, and a data mask unit 316C. The data mask unit 316C cyclically switches a third test data sequence (a test data C) and mask data and supplies the third test data sequence and the mask data to the data selector 302C as a test data sequence. The data selector 302C arranges the test data sequence in a predetermined position of a blanking period of video data. The image processor 306C applies the image processing to the video data in which the test data sequence is arranged. The output unit 308C packs the video data applied with the image processing into a predetermined format and outputs the video data to the system memory 100. The control signal generator 310C controls the data selector 302C, the image processor 306C, the output unit 308C, the control signal generator 310C, and the data mask unit 316C.

Figure 11:
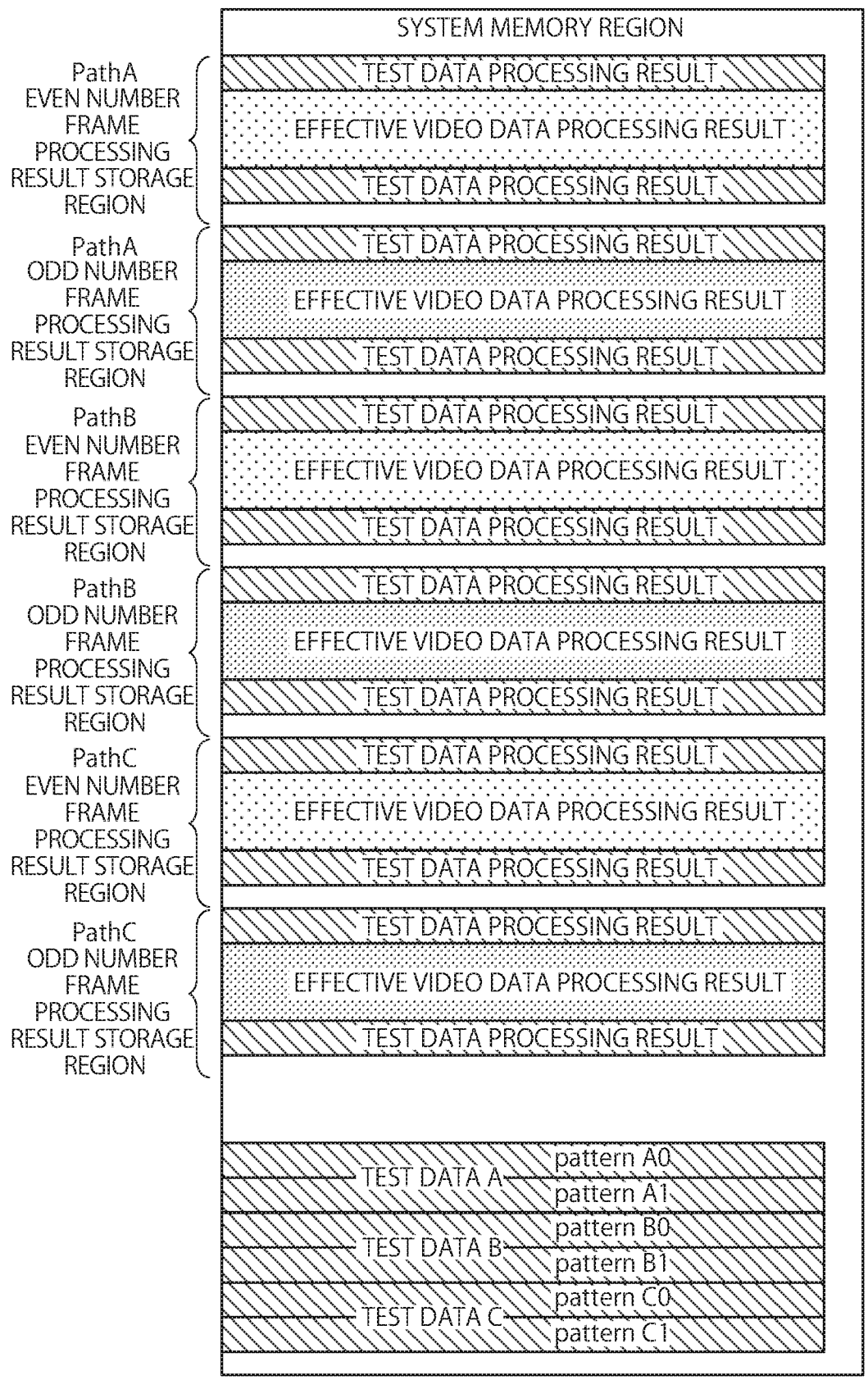
FIG. 11 is a diagram showing an arrangement example of a test data sequence and a processing result, which is obtained by applying image processing to the test data sequence, stored in a system memory according to the third embodiment.

An arrangement example in the system memory 100 of a test data sequence according to the third embodiment is explained with reference to FIG. 11. FIG. 11 is a diagram showing an arrangement example of the test data sequence according to the third embodiment and image processing result data, which is obtained by applying the image processing to the test data sequence, stored in the system memory 100. As shown in FIG. 11, the arrangement example in the system memory 100 according to the third embodiment is different from the arrangement example in the system memory 100 according to the second embodiment in that three types of test data sequences are stored. Note that, if all of image formats input to the first to third video processors are the same, the types of the test data sequences may be reduced to share the test data sequences. As in the second embodiment, the test data sequences are stored in the system memory 100 in advance by the test data writer 410. Output frame buffers for two screens are secured for each of the video processors 300A, 300B, and 300C.

Referring back to FIG. 10, the input unit 200 is connected to each of the video processors 300A, 3003, and 300C. The test data sequences respectively corresponding to the video processors 300A, 300B, and 300C are selected according to setting by the system controller 108. At timing based on an input unit start signal output by the timing selector 600, the input unit 200 acquires the corresponding test data sequences from the system memory 100 and outputs the test data sequences to the data mask units 316A, 316B, and 316C. The timing selector 600 is connected to the input unit 200. The timing selector 600 controls, according to the setting by the system controller 108, the input unit 200 at timing when the input unit 200 outputs the test data sequence to any one of the data mask units 316A, 316B, and 316C. That is, the timing selector 600 switches, at a predetermined cycle based on the setting by the system controller 108, a start signal of the input unit 200 to a start signal for a timing controller included in a video processor selected out of the video processors 300A, 300B, and 300C.

Figure 12:
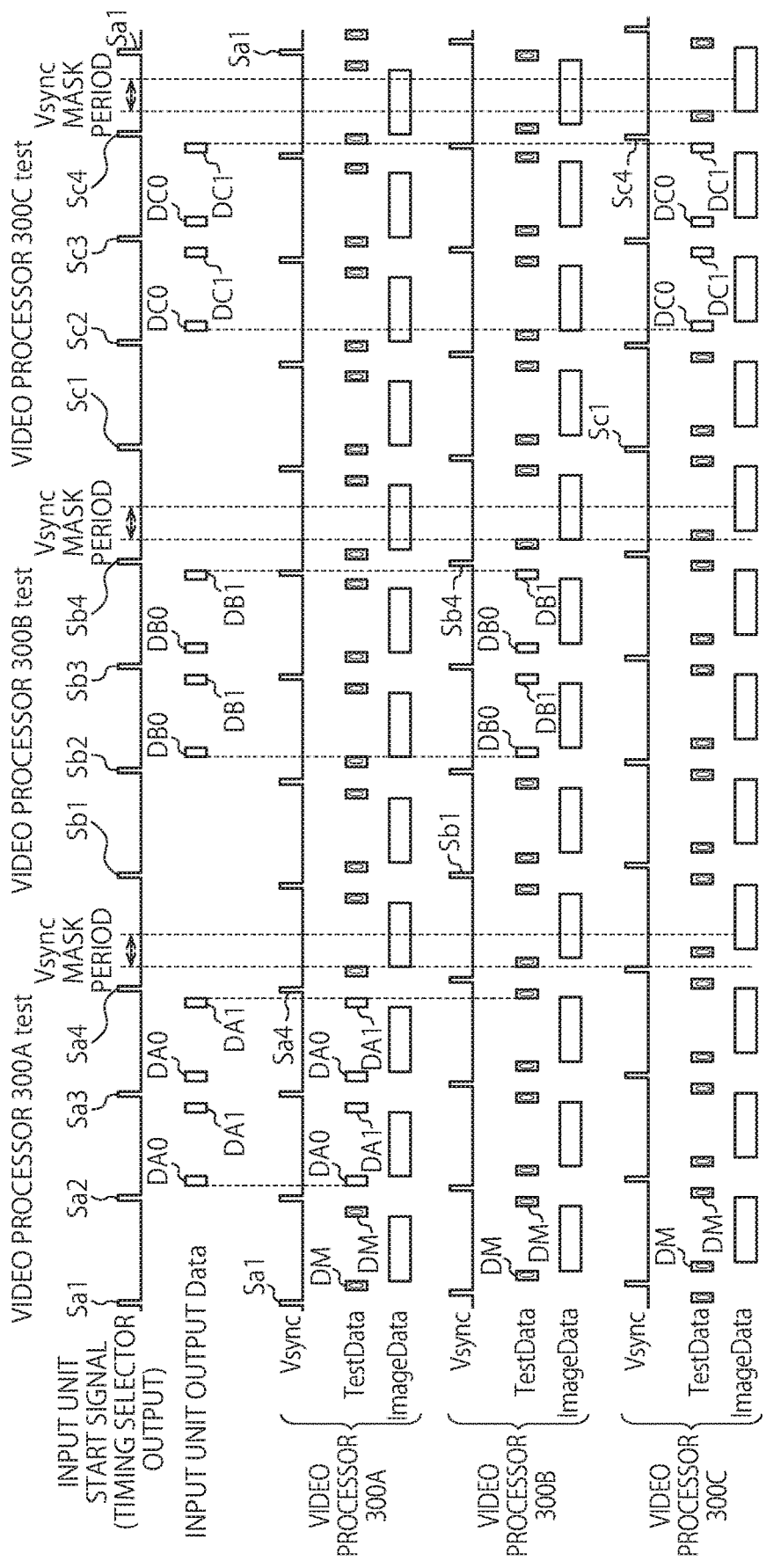
FIG. 12 is a diagram for explaining input unit start signals and arrangement timings of test data sequences in a timing selector.

A switching operation example of the input unit start signal in the timing selector 600 is explained with reference to FIG. 12 and with reference to FIGS. 10 and 11. FIG. 12 is a schematic diagram for explaining arrangement timing of the input unit start signal and the test data sequence in the timing selector 600. In FIG. 12, the horizontal axis represents time and the vertical axis represents the input unit start signal, input unit output Data, vertical synchronization signals Vsync in the video processors, test data sequences Test Data used in the video processors, and image data Image Data input to the video processors. That is, the input unit start signal indicates an input unit start signal output from the timing selector 600 to the input unit 200. The input unit start signal is switched by the timing selector 600 on the basis of the setting by the system controller 108. The input unit output Data indicates a test data sequence acquired from the system memory 100 by the input unit 200. DA0 and DA1, DB0 and DB1, and DC0 and DC1 respectively indicate the test data sequence (the pattern A0 and the pattern A1) in the upper part and the lower part of the screen of the video processor 300A, the test data sequence (the pattern B0 and the pattern B1) of the upper and the lower part of the screen of the video processor 300B, and the test data sequence (the pattern C0 and the pattern C1) of the upper part and the lower part of the screen of the video processor 300C shown in FIG. 11 again.

Referring back to FIG. 12, Vsync of the video processor 300A indicates a driving signal output by the control signal generator 310A. In a field in Test Data of the video processor 300A, a square (DM) indicated by 0 indicates mask data output by the data mask unit 316A. Furthermore, Image Data indicates image data (image data in an effective video data period) acquired by the data selector 302A. Similarly, Vsync of the video processor 300B indicates a start signal output by the control signal generator 310B. In a field of Test Data of the video processor 300B, a square (DM) indicated by 0 indicates mask data output by the data mask unit 316B. Furthermore, Image Data indicates image data (image data in an effective video data period) acquired by the data selector 302B. Similarly, Vsync of the video processor 300C indicates a start signal output by the control signal generator 310C. In a field of Test Data of the video processor 300C, a square (DM) indicated by 0 indicates mask data output by the data mask unit 316C. Furthermore, Image Data indicates image data (image data in an effective video data period) acquired by the data selector 302C.

Output timings of the start signals of the control signal generators 310A, 310B, and 310C are later in the order of the video processor 300A, the video processor 300B, and the video processor 300C according to video data input to the video processor 300A, the video processor 300B, and the video processor 300C from respective imagers.

As shown in FIG. 12, first, a start signal output by the timing selector 600 is set as a start signal of the control signal generator 310A. That is, a start signal Sa1 output by the control signal generator 310A is output as an input unit start signal Sa1 output by the timing selector 600. The system controller 108 performs setting beforehand such that the input unit 200 reads the test data sequences pattern A0 and pattern A1 and performs setting beforehand such that the data mask unit 316A outputs a test data sequence received from the input unit 200. At timing based on input unit start signals Sa2 and Sa3 input following the input unit start signal Sa1, the input unit 200 acquires the test data sequences pattern A0 and pattern A1 from the system memory 100 and outputs test data sequences for two frames to the data selector 302A via the data mask unit 316A in order. The data selector 302A arranges the test data sequences in order in predetermined timing positions of a blanking period of the video data. Note that the system controller 108 performs setting beforehand (between the input unit start signals Sa3 and Sa4) such that the data mask unit 316A outputs mask data from timing of the start signal Sa4 and such that the input unit 200 does not perform reading of data from the system memory 100 from the timing of the start signal Sa4.

Subsequently, the system controller 108 performs setting such that, after timing of the start signal Sa4, the timing selector 600 does not receive start signals input from the video processors. After switching the input unit start signal output by the timing selector 600 to a start signal output by the control signal generator 310B, the system controller 108 performs setting to receive start signals input from the video processors. That is, a start signal Sb1 output by the control signal generator 310B after the setting is output as an input unit start signal Sb1 output by the timing selector 600. The system controller 108 performs setting beforehand such that the input unit 200 reads test data sequences pattern B0 and pattern B1 and performs setting beforehand such that the data mask unit 316B outputs a test data sequence received from the input unit 200. At timing based on input unit start signals Sb2 and Sb3 input following the input unit start signal Sb1, the input unit 200 acquires test data sequences pattern B0 and pattern B1 from the system memory 100 and outputs test data sequences for two frames to the data selector 302B in order via the data mask unit 316B. The data selector 302B arranges the test data sequences in order in predetermined timing positions of a blanking period of video data. Note that the system controller 108 performs setting beforehand (between the input unit start signals Sb3 and Sb4) such that the data mask unit 316B outputs mask data from timing of the start signal Sb4 and such that the input unit 200 does not perform reading of data from the system memory 100 from the timing of the start signal Sb4.

Subsequently, the system controller 108 performs setting such that, after timing of the start signal Sb4, the timing selector 600 does not receive start signals input from the video processors. After switching the input unit start signal output by the timing selector 600 to a start signal output by the control signal generator 310C, the system controller 108 performs setting to receive start signals input from the video processors. That is, a start signal Sc1 output by the control signal generator 310C after the setting is output as an input unit start signal Sc1 output by the timing selector 600. The system controller 108 performs setting beforehand such that the input unit 200 reads test data sequences pattern C0 and pattern C1 and performs setting beforehand such that the data mask unit 316C outputs a test data sequence received from the input unit 200. At timing based on input unit start signals Sc2 and Sc3 input following the input unit start signal Sc1, the input unit 200 acquires test data sequences pattern C0 and pattern C1 from the system memory 100 and outputs test data sequences for two frames to the data selector 302C via the data mask unit 316C. The data selector 302C arranges the test data sequences in order in predetermined timing positions of a blanking period of video data. Note that the system controller 108 performs setting beforehand (between the input unit start signals Sc3 and Sc4) such that the data mask unit 316C outputs mask data from timing of the start signal Sc4 and such that the input unit 200 does not perform reading of data from the system memory 100 from the timing of the start signal Sc4.

Subsequently, the system controller 108 performs setting such that, after timing of the start signal Sc4, the timing selector 600 does not receive start signals input from the video processors. After switching the input unit start signal output by the timing selector 600 to a start signal output by the control signal generator 310A, the system controller 108 performs setting to receive start signals input from the video processors. That is, the start signal Sa1 output by the control signal generator 310A after the setting is output as the input unit start signal Sa1 output by the timing selector 600.

In this way, in an operation timing example shown in FIG. 12, test operation for the video processors 300A, 300B, and 300C is performed at a twelve-frame cycle. The twelve-frame cycle is based on the number of frame buffers of the system memory 100 included in each of the plurality of video processors 300A, 300B, and 300C. That is, the twelve-frame cycle is a double of six, which is the number of frame buffers of the system memory 100.

The timing selector 600 selects, according to the setting by the system controller 108, a start signal of a video processor of a test data sequence input target out of start signals output by timing controllers included in the video processors 300A, 300B, and 300C and, at every four times of outputs of input unit start signals, switches the start signal to a start signal of a video processor of the next test data sequence input target in order.

The system controller 108 sets beforehand, in the input unit 200, a reading start of a test data sequence corresponding to the video processor of the test data sequence input target on the basis of an input unit start signal immediately after the input unit start signal output by the timing selector 600 is switched to the start signal of the video processor of the test data sequence input target. The system controller 108 sets, in the control signal generator included in the video processor of the test data sequence input target, an output of a test data sequence by the data mask unit included in the video processor of the test data sequence input target. Further, the system controller 108 sets beforehand, in the input unit 200, a reading stop of a test data sequence on the basis of a third input unit start signal after the input unit start signal output by the timing selector 600 is switched to the start signal of the video processor of the test data sequence input target. The system controller 108 sets, in the control signal generator included in the video processor of the test data sequence input target, an output of master data by the data mask unit included in the video processor of the test data sequence input target.

Consequently, in a two-frame period between a second input unit start signal and a fourth input unit start signal after the input unit start signal output by the timing selector 600 is switched to the start signal of the video processor of the test data sequence input target, a test data sequence read from the system memory 100 by the input unit 200 is input to the data selector included in the video processor of the test data sequence input target via the data mask unit included in the video processor of the test data sequence input target. In a period other than the two-frame period, the respective data mask units 316A, 316B, and 316C output master data to the data selectors included in the respective video processors.

As it is seen from the above, as evaluation values of the video data respectively processed by the video processors 300A, 300B, and 300C, an evaluation value for an image processing result of the test data sequence in the two-frame period and an evaluation value for an image processing result of the mask data in a ten-frame period are repeated. If the respective evaluation values are not a predetermined value in the twelve-frame cycle, the abnormality detector 400 outputs a signal indicating that an abnormality occurs.

As explained above, according to this embodiment, the timing selector 600 inputs, to the input unit 200, on the basis of the predetermined frame cycle, the input unit start signal sequentially switched and selected out of the start signals output by the timing controllers included in the video processors 300A, 300B, and 300C. Consequently, it is possible to arrange, via the common input unit 200, on the basis of the predetermined frame cycle, different test data sequences in the blanking period of the video data captured by each of the video processors 300A, 300B, and 300C.

Therefore, if the respective evaluation values for the image processing results are not the predetermined value in the twelve-frame cycle, it is possible to detect that an abnormality has occurred in the image processing apparatus 1.

At least a part of the image processor 1 in the above embodiments may be formed of hardware or software. In the case of software, a program realizing at least a partial function of the image processor 1 may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the image processor 1 can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processing apparatus comprising:
   video processor configured to:
   arrange a first test data sequence among a plurality of different test data sequences in predetermined order in a blanking period of video data including an image data period in which image data is arranged and the blanking period in which the image data is not arranged, and arrange a second test data sequence among the plurality of different test data sequences, the second test data sequence being different than the first test data sequence, during a frame cycle of a predetermined number, and
   apply image processing applied to the image data of the video data to the first test data sequence and the second test data sequence arranged in the video data;
   a calculator configured to calculate an evaluation value for the image processing result of the first test data sequence and the second test data sequence; and
   a detector configured to output a signal indicating an abnormality when the evaluation value does not fluctuate for each the frame cycle.

2. The image processing apparatus according to claim 1, further comprising an input to the video processor configured to input the plurality of different test data sequences in the predetermined order, wherein
   the input to the video processor repeats the input of the plurality of different test data sequences at the frame cycle of the predetermined number, and
   the video processor is further configured to arranges the plurality of different test data sequences in the order of the input from the input to the video.

3. The image processing apparatus according to claim 2, wherein the frame cycle of the predetermined number is based on a number of frame buffers secured in a system memory with respect to the video processor.

4. The image processing apparatus according to claim 2, further comprising a timing controller configured to control operation timings of the input to the video processor and the video processor.

5. The image processing apparatus according to claim 1, further comprising:
   an input to the video processor configured to input the plurality of different test data sequences in the predetermined order, wherein the video processor is further configured to switch, in predetermined order, a data sequence input from the input to the video processor and mask data having a predetermined value and generate the data sequence and the mask data as a test data sequence, and arrange the first test data sequence and the second test data sequence based on the order of the generation of the first test data sequence and the second test data sequence.

6. The image processing apparatus according to claim 5, wherein the video processor repeats the switching of the data sequence input from the input to the video processor and the mask data having the predetermined value at the frame cycle of the predetermined number.

7. The image processing apparatus according to claim 1, wherein, when the evaluation value for the image processing result of current video data and the evaluation value for an image processing result of video data in which a test data sequence different from a test data sequence of the current video data is used coincide with each other, the detector outputs the signal indicating the abnormality.

8. The image processing apparatus according to claim 1, wherein, when the evaluation value for an image processing result of current video data and the evaluation value for the image processing result of video data in past in which the image processing is applied to a test data sequence same as a test data sequence of the current video data are different from each other, the detector outputs the signal indicating the abnormality.

9. The image processing apparatus according to claim 1, wherein, when the reference evaluation value is not stored, the detector causes the storage to store, as the reference evaluation value, the evaluation value for the image processing result of the current video data.

10. The image processing apparatus according to claim 9, wherein, when the reference evaluation value is not stored, the detector causes the storage to store, as the reference evaluation value, the evaluation value for the image processing result of the current video data.

11. The image processing apparatus according to claim 1, wherein the calculator performs processing of any one of cyclic redundancy check, checksum, and hash in a predetermined range of an image processing result obtained by applying the image processing to the first test data sequence and calculates the evaluation value, and the detector outputs the signal indicating the abnormality on the basis of the evaluation value.

12. The image processing apparatus according to claim 1, wherein the video processor arranges the first test data sequence in at least one of a vertical blanking period in an upper part of a screen of the video data and a vertical blanking period in a lower part of the screen of the video data.

13. The image processing apparatus according to claim 12, wherein the video processor arranges the first test data sequence in the vertical blanking period in the lower part of the screen of the video data.

14. The image processing apparatus according to claim 12, wherein, when the image processor performs the image processing with different parameters on an upper side and a lower side of the screen of the video data, the video processor arranges the test first data sequence in the vertical blanking period in the upper part of the screen of the video data and the vertical blanking period in the lower part of the screen of the video data.

15. The image processing apparatus according to claim 14, wherein the calculator connects an image processing result of a test data sequence on the upper side of the screen and an image processing result of a test data sequence on the lower side of the screen stored in a system memory and calculates one evaluation value.

16. The image processing apparatus according to claim 1, wherein the video processor is further configured to output the video data applied with the image processing to a system memory; and wherein the image processing apparatus is configured to recognize an obstacle on the basis of the video data applied with the image processing stored in the system memory, wherein when the detector outputs the abnormality signal indicating the abnormality, the obstacle recognizer disables an obstacle recognition result.

* * * * *